(12) United States Patent  
Nishimine (10) Patent No.: US 9,657,612 B2  
(45) Date of Patent: May 23, 2017

(54) CONTROL SYSTEM FOR ELECTRIC VEHICLE

(71) Applicant: Toyota Jidosha Kabushiki Kaisha, Toyota-shi, Aichi-ken (JP)

(72) Inventor: Akiko Nishimine, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/825,527

(22) Filed: Aug. 13, 2015

(65) Prior Publication Data

US 2016/0069231 A1    Mar. 10, 2016

(30) Foreign Application Priority Data

Sep. 4, 2014    (JP) .................................. 2014-179826

(51) Int. Cl.
| | |
|---|---|
| *F01M 1/02* | (2006.01) |
| *B60L 11/00* | (2006.01) |
| *F01M 1/12* | (2006.01) |
| *F01M 5/02* | (2006.01) |

(52) U.S. Cl.
CPC ................. *F01M 1/02* (2013.01); *B60L 11/00* (2013.01); *F01M 1/12* (2013.01); *F01M 2001/123* (2013.01); *F01M 2005/026* (2013.01)

(58) Field of Classification Search
CPC .................................. F01M 1/02; B60L 11/00
See application file for complete search history.

(56) References Cited

U.S. PATENT DOCUMENTS

| | | | | |
|---|---|---|---|---|
| 6,805,647 | B2* | 10/2004 | Silveri et al. ............ | B60K 6/48 475/122 |
| 8,827,656 | B2* | 9/2014 | Sano et al. .......... | F16H 61/0206 417/45 |
| 2009/0175742 | A1* | 7/2009 | Grethel et al. .......... | F04B 17/03 417/364 |

FOREIGN PATENT DOCUMENTS

JP        2006-161850 A     6/2006

* cited by examiner

*Primary Examiner* — Thomas Tarcza  
*Assistant Examiner* — Michael Berns  
(74) *Attorney, Agent, or Firm* — Dinsmore & Shohl LLP (57) ABSTRACT

A control system for electric vehicle is provided. The control system is applied to an electric vehicle (Ve) having a motor (2, 3) and an electric oil pump (19) driven by a pumping motor (20). The control system is configured to activate the electric oil pump (19) with a predetermined duty cycle when a main switch is turned on to bring the vehicle (Ve) into a ready-on state where the vehicle (Ve) is ready to travel.

6 Claims, 6 Drawing Sheets

CONTROL SYSTEM FOR ELECTRIC VEHICLE

The present invention claims the benefit of Japanese Patent Applications No. 2014-179826 filed on Sep. 4, 2014 with the Japanese Patent Office, the disclosures of which are incorporated herein by reference in its entirety.

BACKGROUND

Field of the Invention

The present invention relates to a control system for a hybrid vehicle and an electric vehicle powered by at least one motor, and especially to a control system for an electric vehicle having an electric oil pump that establishes hydraulic pressure driven by its own electric motor.

Discussion of the Related Art

JP-A-2006-161850 describes a hydraulic supply device that is applied to a hybrid vehicle having an engine and a motor as a prime mover, and configured to supply operating oil to a transmission while stopping the engine. According to the teachings of JP-A-2006-161850, the hydraulic supply device is comprised of a mechanical oil pump activated by the prime mover of the vehicle, an electric motor powered by a battery, an electric oil pump activated by the electric motor, a transmission mechanism to which the operating oil is supplied from those mechanical and electronic oil pumps and a pump driver that operates the electric motor. Specifically, when starting the electric motor by the pump driver, the electric motor is rotated at fixed speed for a predetermined period, and then the electric motor is rotated in a manner to output a fixed torque.

Thus, in the hydraulic supply device taught by JP-A-2006-161850, a speed of an electric motor is fixed to a predetermined speed when starting the electric motor of the electric oil pump. Therefore, even if the oil pump undesirably suck air, a resultant load change of the electric pump can be prevented.

Thus, according to the hydraulic supply device taught by JP-A-2006-161850, the speed of the electric motor is fixed to the predetermined speed when starting the electric motor of the electric oil pump. For this reason, even if the electric oil pump sucks air when starting the electric motor, the load change of the electric pump can be prevented so that the electric oil pump can be started smoothly. However, under a cold climate, a viscosity of the oil is increased to disturb the startup of the electric oil pump. Basically, according to the conventional art of the hydraulic system having a mechanical oil pump and an electric oil pump as taught by JP-A-2006-161850, an output power of the electric motor for driving the electric oil pump is considerably smaller than that of the prime mover for driving the mechanical oil pump. In the hydraulic system of this kind, if the electric motor is started under the condition that the viscosity of the oil is high at a low temperature, the electric oil pump may not be started smoothly due to shortage of electric power generated by the electric motor.

The present invention has been conceived noting the foregoing technical problems, and it is therefore an object of the present invention is to provide a control system for an electric vehicle configured to startup an electric oil pump smoothly by an electric motor other than a prime mover of the vehicle.

SUMMARY OF THE INVENTION

The present invention relates to a control system for an electric vehicle having a motor serving as a prime mover, and an electric oil pump driven by a pumping motor to generate hydraulic pressure. The control system is configured to activate the electric oil pump with a predetermined duty when a main switch is turned on to bring the vehicle into a ready-on state where the vehicle is ready to travel.

The control system may be configured to activate the pumping motor with a predetermined duty after the vehicle is brought into the ready-on state to be propelled by the motor.

The control system may also be configured to activate the pumping motor with a second duty to drive the electric oil pump during a predetermined period after starting the electric oil pump, that is larger than a first duty to activate the pumping motor under a normal motor running of the vehicle.

The control system may be further configured to determine necessity to deliver oil to a lubrication site by the electric oil pump, and to activate the pumping motor with a third duty to drive the electric oil pump that is smaller than the first duty if the electric oil pump is not required to deliver the oil to the lubrication site.

For example, a sensorless motor that does not have a sensor for detecting a position of a rotor may be employed as the pumping motor.

The control system may be applied to a vehicle having an engine and a mechanical oil pump driven by the engine to generate hydraulic pressure. In this case, the control system may be configured to keep activating the electric oil pump when starting the engine during activation of the electric oil pump.

The control system may be applied to a vehicle having an engine, a mechanical oil pump driven by the engine to generate hydraulic pressure, and a passage to which the oil discharged from the electric oil pump and the oil discharged from the mechanical oil pump are delivered. In this case, the control system may be configured to stop the electric oil pump when starting the engine during activation of the electric oil pump.

In the vehicle, the electric oil pump is started when a main switch of the electric vehicle is turned on. However, it is difficult to startup the electric oil pump to establish hydraulic pressure if viscosity of the oil is too high at a low temperature. In order to solve such technical difficulty, according to the present invention, the control system to start the electric oil pump when the vehicle is powered or immediately after the vehicle is powered on so that the electric pump can be started certainly.

The electric oil pump may be started after starting the EV running of the vehicle so that noises resulting from starting the electric oil pump may be lost in the operating noises of the prime mover and travelling noises of the vehicle.

Specifically, when starting the electric oil pump, the electric oil pump is driven with a larger duty to generate larger torque than that required under the normal EV running so as to startup the electric oil pump further certainly.

If the electric oil pump does not required to deliver oil to the lubrication site, duty of the electric motor is reduced to be smaller than that under the normal EV running so as to save electric power for driving the electric motor.

As described, the sensorless motor may be used as an electric motor for activating the electric oil pump. The sensorless motor has no sensor for detecting a position of a rotor, and hence a structure thereof may be simplified as compared to that of a motor having a sensor. Accordingly, it is advantageous to use the sensorless motor in view of cost and reliability. However, control of the sensorless motor is rather complicate when starting or and when rotating at extremely low speed and hence burden on the motor would be increased. In order to solve such problem, according to the present invention, the electric oil pump is activated with higher duty cycle than that under the normal condition when starting the electric motor of the electric oil pump. For this reason, the sensorless motor can be started properly.

Optionally, the electric oil pump may be driven continuously when starting the engine during activation of the electric oil pump. In this case, opportunities to startup the stopping electric oil pump can be reduced.

As described, the control system may be applied to the hybrid vehicle having the engine and the motor. In the hybrid vehicle, the mechanical oil pump is driven by the engine to generate hydraulic pressure. However, the control system may optionally be configured to stop the electric oil pump to avoid interference between the oil discharged from the mechanical oil pump and the oil discharged from the electric oil pump in the common oil passage so that the oil can be delivered properly to the lubrication sites.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENTS

Figure 1:
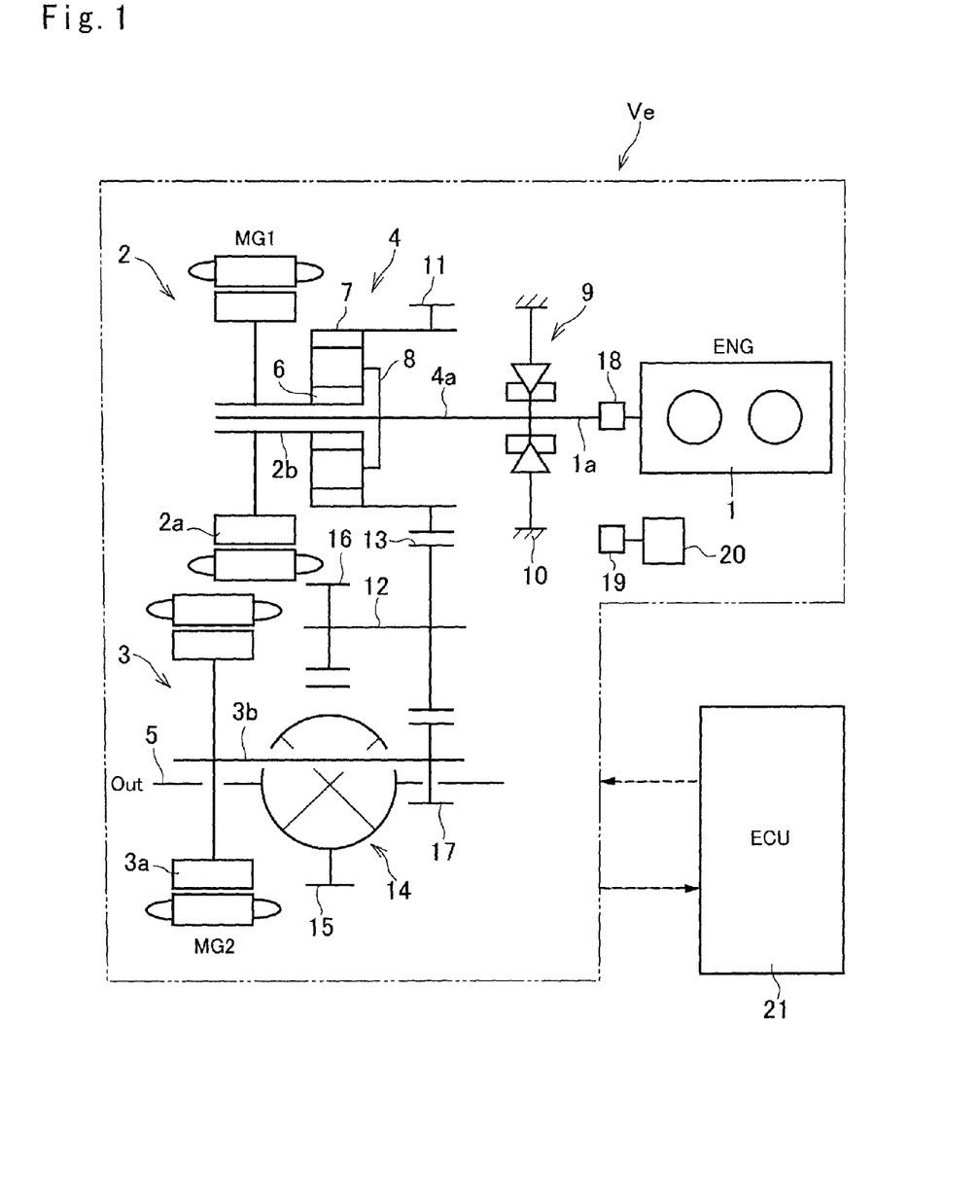
FIG. 1 is a view showing one example of the electric vehicle to which the present invention is applied.

Referring now to FIG. 1, there is shown a preferred example of a structure of the electric vehicle to which the present invention is applied. A prime mover of the electric vehicle Ve is comprised of an engine 1 (ENG), a first motor-generator 2 (MG1), and a second motor-generator 3 (MG2). A power of the engine 1 is distributed to the first motor-generator 2 side and to a drive shaft 5 side through a power distribution device 4. Meanwhile, an electric power generated by the first motor-generator 2 can be supplied to the second motor-generator 3 so that the second motor-generator 3 is driven to generate a power for assisting driving force to rotate the drive shaft 5.

The engine 1 is started and stopped electrically, and output power thereof is also adjusted electrically. Specifically, given that a gasoline engine is used as the engine 1, an opening degree of a throttle valve, an amount of fuel supply, a commencement and a termination of ignition, an ignition timing etc. are controlled electrically.

In this preferred example, a permanent magnet type synchronous motor having a generating function is used individually as the first motor-generator 2 and the second motor-generator 3. Each of the first motor-generator 2 and the second motor-generator 3 is individually connected with a not shown battery through a not shown inverter to control a rotational speed and a torque thereof so that the motor-generators 2 and 3 can be operated selectively as a motor and a generator responsive to a current applied thereto.

Specifically, in the example shown in FIG. 1, the power distribution device 4 is a single pinion type planetary gear unit adapted to perform a differential action among three rotary element such as a sun gear 6, a ring gear 7 and a carrier 8.

The planetary gear unit serving as the power distribution device 4 is arranged coaxially with an output shaft 1a of the engine 1, and the first motor-generator 2 is situated on an opposite side of the engine 1 across the power distribution device 4. The sun gear 6 of the power distribution device 4 is connected with a rotary shaft 2b rotated integrally with a rotor 2a of the first motor-generator 2, and the ring gear 7 as an internal gear is situated concentrically with the sun gear 6. A plurality of pinion gears are interposed between the sun gear 6 and the ring gear 7 while meshing with those gears, and those pinion gears are supported by the carrier 8 connected with an input shaft 4a of the power distribution device 4 in a rotatable and revolvable manner. The input shaft 4a is connected with the output shaft 1a of the engine 1 through a one-way brake 9.

The one-way brake 9 is disposed between the output shaft 1a or the carrier 8 and a fixed member 10 such as a housing. Specifically, the one-way brake 9 is brought into engagement to stop rotation of the engine 1 when torque is applied to the output shaft 1a or the carrier 8 in a direction to rotate in a counter direction. That is, the rotation of the output shaft 1a or the carrier 8 can be stopped by the one-way brake 9 depending on the direction of the torque applied thereto.

A drive gear 11 is an external gear that is formed around the ring gear 7 of the power distribution device 4 integrally therewith, and the countershaft 12 is arranged in parallel with a common rotational axis of the power distribution device 4 and the first motor-generator 2. A counter driven gear 13 is fitted onto one of the end portions of the countershaft 12 (i.e., right side in FIG. 1) in a manner to be rotated therewith while being meshed with the drive gear 11. A counter drive gear 16 is fitted onto the other end portion of the countershaft 12 (i.e., left side in FIG. 1) in a manner to be rotated therewith while being meshed with a ring gear 15 of a deferential gear unit 14 serving as a final reduction. Thus, the ring gear 7 of the power distribution device 4 is connected with the drive shaft 5 through the drive gear 11, the countershaft 12, the counter driven gear 13, the counter drive gear 16, and the deferential gear unit 14.

Torque of the second motor-generator 3 can be added to torque transmitted from the power distribution device 4 to the drive shaft 5. To this end, the second motor-generator 3 is arranged in parallel with the countershaft 12, and a reduction gear 17 connected with a rotor shaft 3b rotated integrally with a rotor 3a is meshed with the counter driven gear 13. That is, the ring gear 7 of the power distribution device 4 is connected with the drive shaft 5 and the second motor-generator 3 through the aforementioned gear train or the reduction gear 17.

The vehicle Ve is provided with two oil pumps such as a first oil pump 18 and a second oil pump 19 to cool the motor-generators 2 and 3 and to lubricate the power distribution device 4.

The first oil pump 18 is a mechanical oil pump conventionally used for an engine or a transmission of automobiles to supply lubrication oil and to generate hydraulic pressure. The first oil pump (to be simply called as the "MOP" hereinafter) 18 is activated by torque of the engine 1 to establish hydraulic pressure.

As described, the MOP 18 is driven by the engine 1, and therefore the MOP 18 is stopped to be disabled to establish hydraulic pressure when the engine 1 is stopped. In order to ensure oil delivery to the motor-generators 2 and 3 and to a lubrication site such as the power distribution device 4 even when the engine 1 is stopping, the vehicle Ve is provided with the second oil pump 19.

The second oil pump 19 (to be simply called as the "EOP" hereinafter) is an electric oil pump that is driven by a torque of an electric motor to establish hydraulic pressure. To this end, a pumping motor 20 is arranged in the vehicle Ve in addition to the first motor-generator 2 and the second motor-generator 3. For example, a sensorless motor having no sensor for detecting a position of a rotor such as a hall sensor or an encoder may be used as the pumping motor 20. Given that the sensorless motor is used as the pumping motor 20, a structure thereof may be simplified as compared to a case of using a motor having a sensor. In addition, reliability of the pumping motor 20 may be ensured as well as a cost thereof may be reduced.

A passage for delivering the oil to the EOP 19 may be disposed outside of a not shown casing holding the first motor-generator 2 and the power distribution device 4 so that a position of the EOP 19 may be adjusted flexibly according to need. Passages for delivering the oil from the EOP 19 to lubrication sites may also be arranged flexibly outside of the casing using a pipe or a tube.

According to the preferred example, the control system is provided with an electronic control unit (abbreviated as the "ECU" hereinafter) 21 for controlling the engine 1, the first motor-generator 2, the second motor-generator 3, and the pumping motor 20. The ECU 21 is comprised of a microcomputer configured to carry out a calculation based on incident data and preinstalled data, and to transmit a calculation result in the form of command signal.

Figure 2:
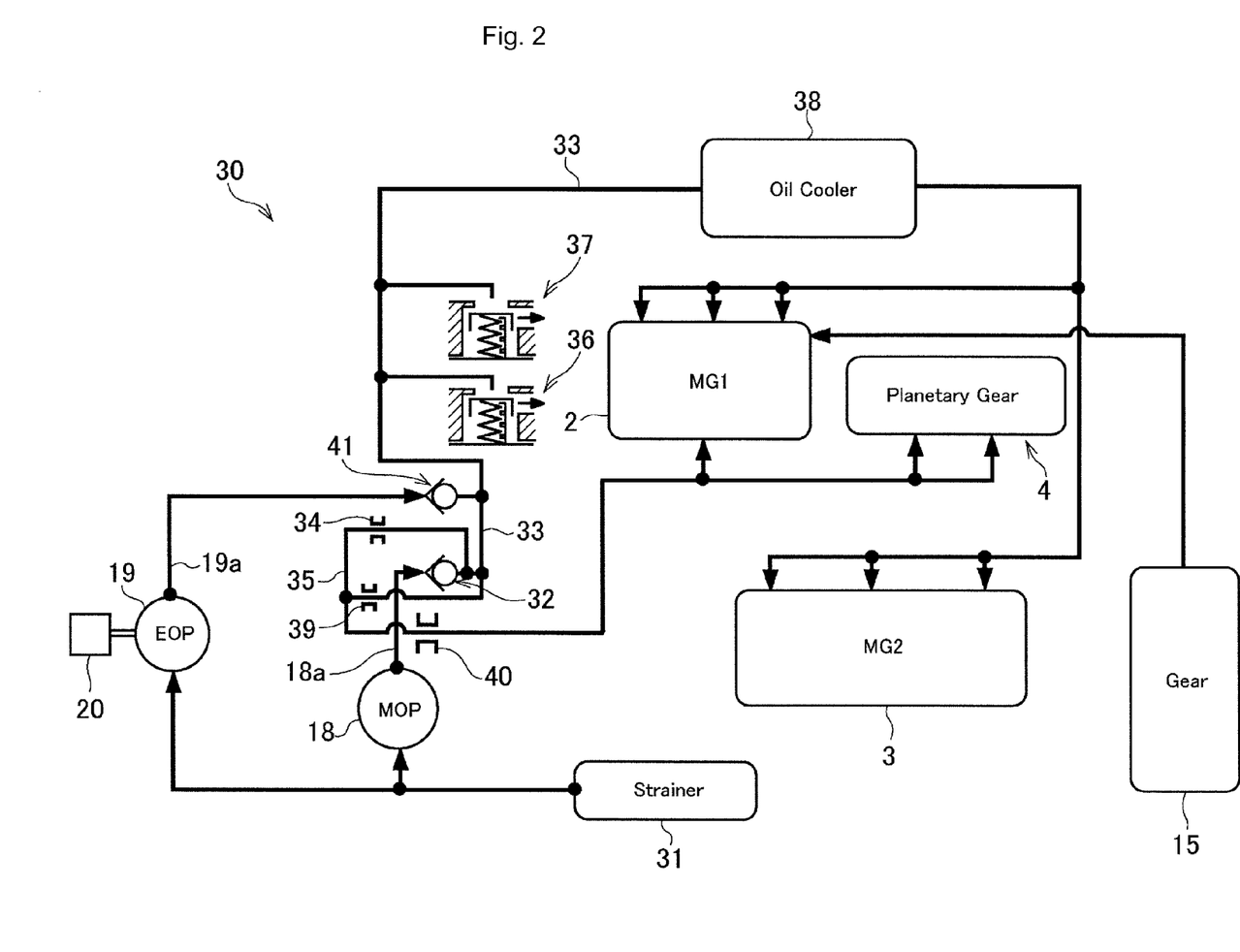
FIG. 2 a view showing one example of a hydraulic circuit of a lubricating system of the electric vehicle shown in FIG. 1.

Referring now to FIG. 2, there is shown a hydraulic circuit 30 from the MOP 18 and the EOP 19 to lubrication sites of the first motor-generator 2, the second motor-generator 3 and the power distribution device 4. The MOP 18 draws the oil through a strainer 31, and discharges pressurized oil from an outlet 18a connected to a first passage 33 through a check valve 32. The MOP 18 is also connected to a second passage 35 through the check valve 32 and an orifice 34. The check valve 32 allows the oil to flow only in a direction from the outlet 18a toward the first and the second passages 33 and 35.

Specifically, relief valves 36, 37 and an oil cooler 38 are disposed on the first passage 33, and the first passage 33 is branched to provide a communication between the MOP 18 and each motor-generator 2 and 3 so that coil ends and rotary members of the motor-generators 2 and 3 are cooled and lubricated by the oil delivered from the MOP 18. The first passage 33 is connected to the second passage 35 through an orifice 39 at an end portion of downstream side of the check valve 32.

The relief valve 36 is opened to drain the oil from the first passage 33 upon exceedance of hydraulic pressure in the first passage 33 above a predetermined level. The relief valve 37 is an auxiliary relief valve that is used instead of the relief valve 36 in case of a failure of the relief valve 36. For example, a water-cooled type oil cooler may be used as the oil cooler 38, and the oil cooler 38 is disposed between the relief valve 37 and the lubrication sites to cool the oil flowing through the first passage 33.

The second passage 35 provides a communication between a discharging side of the check valve 32 and the lubrication sites such as the first motor-generator 2 and the power distribution device 4 through the orifice 40, so as to cool and lubricate the first motor-generator 2 as well as gears and rotary members of the power distribution device 4.

In addition, the first motor-generator 2 is also lubricated by the oil scattered by a rotation of the ring gear 15 of the differential gear 14.

The EOP 19 is disposed in parallel to the MOP 18. As the MOP 18, the EOP 19 draws the oil through a strainer 31 and discharges pressurized oil from an outlet 19a connected to the first passage 33 through a check valve 41. The check valve 41 is adapted to allow the oil to flow only in a direction from the outlet 19a toward the first passage 33.

In the hydraulic circuit 30 shown in FIG. 2, when the engine 1 is stopped and hence the hydraulic pressure cannot be established by the MOP 18, the EOP 19 may be activated by the pumping motor 20 to deliver the pressurized oil to the first motor-generator 2, the second motor-generator 3 the power distribution device 4.

Operation mode of the vehicle Ve is selected in an optimally fuel or energy efficient manner. Specifically, the drive mode of the vehicle Ve is selected from HV mode where the vehicle Ve is powered at least by the engine 1, and EV mode where the vehicle Ve is powered at least one of the motor-generators 2, 3 while stopping the engine.

The EV mode can be selected depending on a running condition from first EV mode where the vehicle Ve is powered by the second motor-generator 3, and second EV mode where the vehicle Ve is powered by both the first and second motor-generators 2, 3.

Under the first EV mode, the second motor-generator 3 is operated as a motor to generate torque by rotating in a forward direction (i.e., a rotational direction of the output shaft 1a of the engine 1) so that the vehicle Ve is propelled by the second motor-generator 3.

Under the second EV mode, the vehicle Ve is powered by both of the first and the second motor-generators 2, 3. In this case, the first motor-generator 2 is rotated in a counter direction (a reverse direction against a rotational direction of the output shaft 1a of the engine 1) to generate torque, but the second motor-generator 3 is also rotated in the forward direction to generate torque. In this situation, torque in a counter direction is applied to the output shaft 1a of the engine 1 so that the one-way brake 9 is brought into engagement. Consequently, the vehicle Ve is allowed to be propelled efficiently by the motor-generators 2 and 3 while stopping a rotation of the engine 1.

Thus, the operation mode is switched between the HV mode and the EV mode depending on a running condition and a demanded driving force. As stated above, under the EV mode, the engine 1 is stopped and hence the MOP 18 is not allowed to generate hydraulic pressure. However, under the first EV mode, the oil is required to lubricate and cool the second motor-generator 3. Likewise, under the second EV mode, the oil is required to lubricate and cool the power distribution device 4 as well as the motor-generators 2 and 3. According to the preferred example, therefore, the EOP 19 is driven by activating the pumping motor 20 to generate the hydraulic pressure when the EV mode is selected or when the engine 1 is stopped. Given that the vehicle Ve is a Plug in Hybrid Vehicle (to be abbreviated as "PHV" hereinafter) in which a battery for propelling the vehicle can be charged by an external electric power source, the EV mode would be selected more frequently in comparison with the conventional hybrid vehicle. That is, if the vehicle Ve is the PHV, the EOP 19 is activated more frequently to generate hydraulic pressure. The PHV is provided with a large battery and the first EV mode is selected in most cases. If a travelling time under the first EV mode is too long, the power distribution device 4 is needed to be lubricated and cooled by the EOP 19 as the second EV mode.

The power of the pumping motor 20 for activating the EOP 19 is considerably smaller than the power of the engine 1 for driving the MOP 18. For example, if viscosity of the oil is increased at a low temperature, a load on the pumping motor 20 to start the EOP 19 is increased. Especially, if the EOP 19 and the passages for delivering the oil to the lubrication sites from the EOP 19 are arranged outside of the casing as described, the viscosity of the oil would be increased more easily by a temperature drop. In this case, the EOP 19 may not be started by the pumping motor 20. In order to avoid such disadvantage, according to the preferred example, the control system is configured to carry out the following controls to start the EOP 19 certainly without using power of the prime mover.

Figure 3:
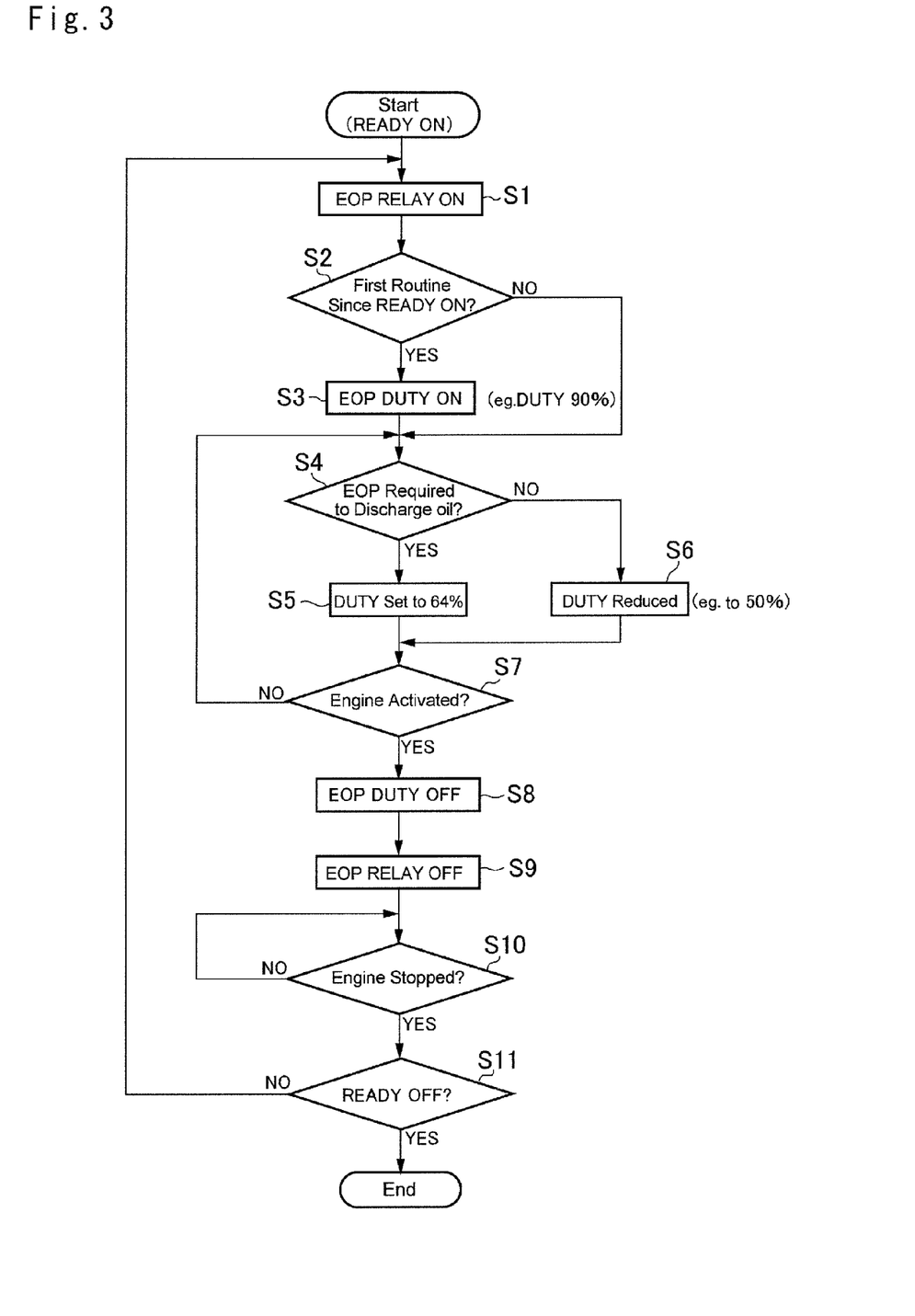
FIG. 3 is a flowchart showing a control example carried out by the control system according to the present invention.

Referring now to FIG. 3, there is shown a flowchart for explaining a control example carried out by the control system of the present invention. The control is commenced under condition that a main switch is turned on to bring the vehicle Ve into a ready-on state where the vehicle Ve is ready to travel under the EV mode, and routine shown therein is repeated at predetermined intervals. In the following explanations of the control example, the term "EV mode" includes both the first EV mode where the vehicle Ve is powered only by the second motor-generator 2 and the second EV mode where the vehicle Ve is powered by both of the first and second motor-generators 2 and 3.

When the main switch is turned on to bring the vehicle Ve into the ready-on state, a relay for activating the EOP 19 is turned on at step S1 so that electric power can be supplied to the pumping motor 20 to start the EOP 19.

Then, at step S2, it is determined whether or not a current routine is a first routine since the vehicle Ve is brought into the ready-on state. If the current routine is the first routine so that the answer of step S2 is YES, a duty cycle of the EOP 19 is on at step S3. In order to startup the EOP 19 smoothly to establish hydraulic pressure, at step S3, a signal of duty cycle of the EOP 19 is set to 90% to drive the pumping motor 20 to generate 90% of the maximum or rated output of the pumping motor 20 that is greater than that generated under the normal condition. Here, as described later, the EOP 19 is driven e.g., with a 64% duty cycle during the normal EV running. Thus, when starting the EOP 19, the pumping motor 20 is driven to generate almost the maximum output power thereof to startup the EOP 19 smoothly.

At step S3, the EOP 19 is activated with a 90% duty cycle for a predetermined time period T counted by a timer. The predetermined time period T is determined in advance in such a manner that the EOP 19 can be started smoothly even though the viscosity of the oil is high at a low temperature. The time period T may be adjusted in accordance with the oil temperature. Specifically, the time period T may be extended with a reduction in the oil temperature or an increment of oil viscosity. By contrast, the time period T may also be shortened with a rise in the oil temperature or a reduction in oil viscosity.

After the elapse of the time period T, the routine advances to step S4.

If the current routine is not the first routine so that the answer of step S2 is NO, the routine advances directly to step S4 while skipping step S3.

At step S4, it is determined whether or not the EOP 19 is required to deliver the oil to the lubrication sites. If the EOP 19 is required to deliver the oil to the lubrication sites so that the answer of step S4 is YES, the routine advances to step S5.

At step S5, the signal of duty cycle of the EOP 19 is reduced to 64% so that the pumping motor 20 is driven to generate 64% of the maximum or rated output so as to deliver the oil from the EOP 19 to the lubrication sites such as the motor-generators 2 and 3 and the power distribution device 4 during the normal EV running.

If the EOP 19 is not required to deliver the oil to the lubrication sites so that the answer of step S4 is NO, the routine advances to step S6 to reduce the signal of duty cycle of the EOP 19 to 50% so that the pumping motor 20 is driven to generate 50% of the maximum or rated output. Thus, if the lubrication sites are not necessarily to be lubricated, the duty cycle of the EOP 19 is further reduced to save electric power for driving the pumping motor 20.

Then, at step S7, it is determined whether or not the engine 1 is activated. Specifically, it is determined whether or not the operating mode has been shifted from the EV mode to the HV mode and hence the engine 1 has been started to propel the vehicle Ve. If the engine 1 has not yet been started so that the answer of step S7 is NO, the routine returns to the step S4 to repeat the foregoing controls.

By contrast, if the engine 1 has been started so that the answer of step S7 is YES, the routine advances to step S8 to further reduce the duty cycle of the EOP 19 to 15% (indicated as "OFF" in FIG. 3). The pumping motor 20 cannot be rotated given that the duty cycle of the EOP 19 falls within a range from 0% to 15%. At step S8, therefore, the pumping motor 20 is stopped and hence the EOP 19 is disabled to discharge the oil.

The above-mentioned duty cycle values, such as 90%, 64%, 50% and 18%, are merely examples of the control of the present invention, and those duty cycle values may be adjusted according to need.

In the hydraulic circuit 30 shown in FIG. 2, the oils from the MOP 18 and from the EOP 19 join together in the first passage 33. If the MOP 18 and the EOP 19 discharge the pressurized oils simultaneously, discharged oil interfere with each other thereby disturbing actuations of the check valve 32 and the check valve 41. In order to avoid such disadvantage, if the engine 1 is under operation and hence the MOP 18 discharges the pressurized oil, the EOP 19 is stopped at step 8 so that the oil can be delivered to the lubrication sites without causing the interference of the oil.

Then, the relay for activating the EOP 19 is turned off at step S9. The electric power for driving the pumping motor 20 can be saved by thus turning off the relay of the EOP 19 immediately after reducing the duty cycle of the EOP 19.

Thereafter, it is determined whether or not the engine 1 has been stopped at step S10. If the engine 1 is still under operation so that the answer of step S10 is NO, the determination of the step S10 is repeated until the engine 1 is stopped.

If the engine 1 has already been stopped so that the answer of step S10 is YES, the routine advances to step S11 to determine whether or not the main switch is turned off to bring the vehicle Ve into ready-off state. If the vehicle Ve has not yet been brought into the ready-off state so that the answer of step S11 is NO, the routine returns to the step S1 to repeat the foregoing controls.

If the vehicle Ve has been brought into the ready-off state so that the answer of step S11 is YES, the routine is terminated until the next opportunity that the vehicle Ve is brought into the ready-on state again.

Figure 4:
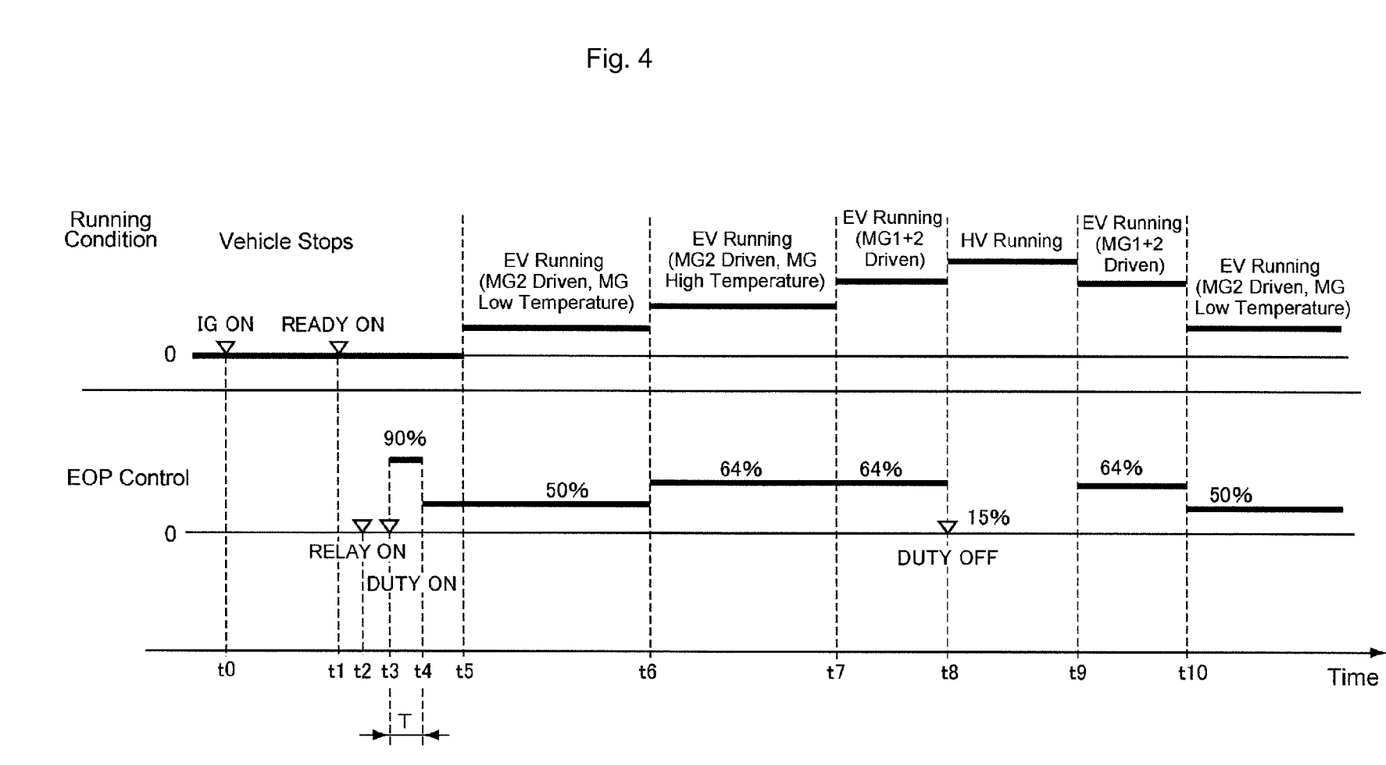
FIG. 4 a time chart showing one example of changes in an operating mode of the electric vehicle and an operating condition of the electric oil pump controlled in response thereto during the control shown in FIG. 3.

Turning to FIG. 4, there is shown a time chart showing temporal changes in the operating mode of the vehicle Ve and the operating condition of the EOP 19 during the control shown in FIG. 3. In the example shown in FIG. 4, a main switch or an ignition switch is turned on at point to. Then, when the vehicle Ve is brought into the ready-on state at point t1, the control of the preferred example is commenced. When the relay for activating the EOP 19 is turned on at point t2, the duty cycle of the EOP 19 is set to 90% at point t3 immediately thereafter, and the EOP 19 is activated with a 90% duty cycle for a predetermined time period T from point t3 to point t4.

Then, the duty cycle of the EOP 19 is reduced at point t4. In this situation, the vehicle Ve has not yet been propelled and oil demands for the lubrication sites such as the motor-generators 2 and 3 and the power distribution device 4 are not so large. For this reason, the EOP 19 is activated with 50% duty cycle which is lower than the 64% duty cycle under the normal condition to save the electric power.

At point t5, the vehicle Ve starts propelling under the EV mode. At the beginning of EV mode, the vehicle Ve is powered only by the second motor-generator 3 under the first EV mode, and the temperature of the second motor-generator 3 has not yet been raised to a level needed to be cooled. In this situation, the EOP 19 is not required to deliver large amount of oil and hence activated with 50% duty cycle.

At point t6, the temperature of the second motor-generator 3 is raised higher than a predetermined temperature and hence the second motor-generator 3 is needed to be lubricated and cooled. To this end, the duty cycle of the EOP 19 is increased to 64%. Then, at point t7, the operating mode is shifted from the first EV mode to the second EV mode where the vehicle Ve is powered by both the first and second motor-generators 2 and 3. Consequently, not only the second motor-generator 3 but also the first motor-generator 2 and the power distribution device 4 have to be cooled and lubricated. To this end, the EOP 19 is kept activated with 64% duty cycle between points t7 and t8.

When the operating mode is shifted from the EV mode to the HV mode and the engine 1 is started at point t8, the duty cycle of the EOP 19 is reduced to 15% (as indicated "DUTY OFF" in FIG. 4). Consequently, the pumping motor 20 is stopped so that the EOP 19 is disabled to generate hydraulic pressure, whereas the MOP 18 is driven by the engine 1 to generate hydraulic pressure. Thus, the MOP 18 will not be operated simultaneously with the EOP 19 so that interference between the oils discharged from those pumps can be avoided.

When the engine 1 is stopped at step S9, the operating mode is shifted from the HV mode to the second EV mode where the vehicle is powered by both motor-generators 2 and 3, and the duty cycle the EOP 19 is therefore raised again to 64%.

Then, at point t10, the operating mode is shifted from the second EV mode to the first EV mode where the vehicle Ve is powered only by the second motor-generator 3. In this situation, the temperature of the second motor-generator 3 is lower than a predetermined level so that the duty cycle of the EOP 19 is reduced to 50%.

Figure 5:
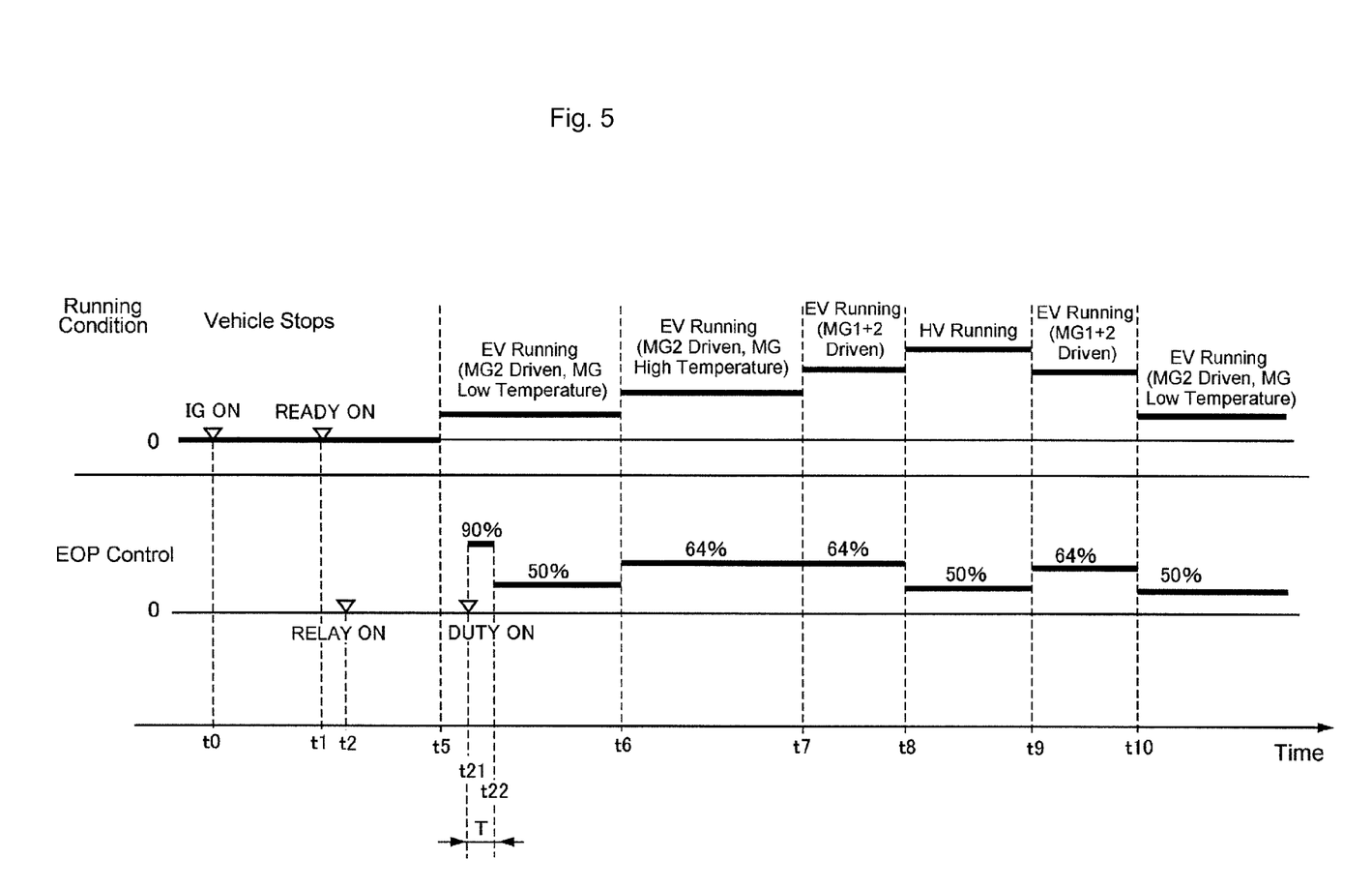
FIG. 5 a time chart showing another example of changes in an operating mode of the electric vehicle and an operating condition of the electric oil pump controlled in response thereto during the control shown in FIG. 3.

According to the example shown in FIG. 4, the EV running of the vehicle Ve is started after the vehicle Ve is brought into the ready-on state and then the relay for activating the EOP 19 is turned on, but the EOP 19 is activated before the EV running is started. Alternatively, according to the present invention, the EOP 19 may also be activated after the EV running is started as shown in FIG. 5. According to the example shown in FIG. 5, the relay for activating the EOP 19 is also turned on at point t2 but the duty cycle of the EOP 19 is not set to 90% immediately thereafter. In this case, specifically, the duty cycle of the EOP 19 is set to 90% immediately after the commencement of the EV running at point t21, and the EOP 19 is activated with a 90% cycle for a predetermined time period T from point t21 to point t22.

According to the example shown in FIG. 5, noises resulting from starting the EOP 19 may be lost in the operating noises of the motor-generators 2 and 3 and the travelling noises of the vehicle.

Contrary to the example shown in FIG. 4, according to the example shown in FIG. 5, the EOP 19 may be activated continuously even after starting engine 1. As shown in a time chart shown in FIG. 5, when the operating mode is shifted from the EV mode to the HV mode and the engine 1 started at point t8, the duty cycle of the EOP 19 is reduced from 64% to 50%. That is, the duty cycle of the EOP 19 is reduced to a level at which the EOP 19 is still allowed to be activated continuously.

Figure 6:
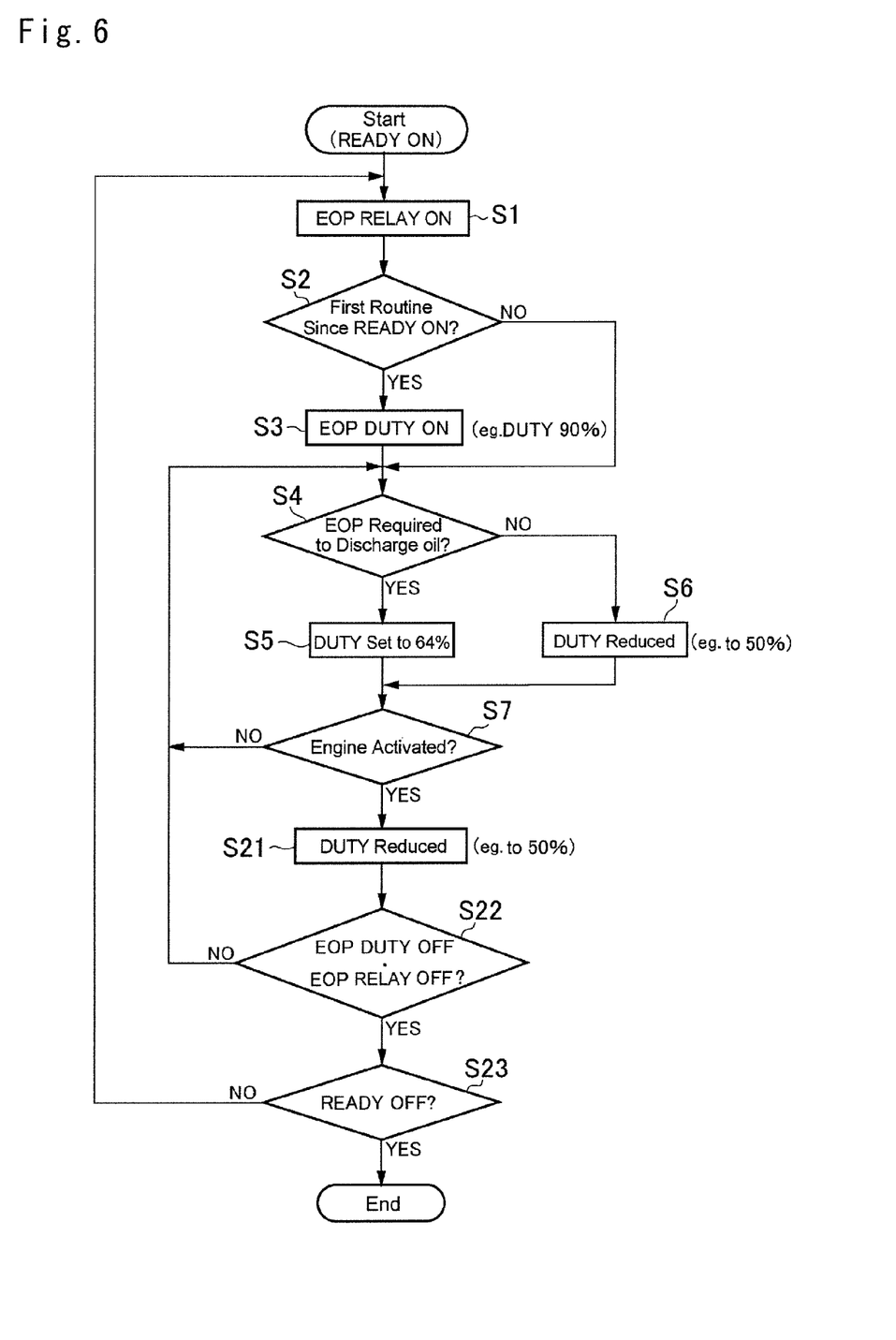
FIG. 6 a flowchart showing another control example carried out by the control system according to the present invention.

Another control example modified to continue an activation of the EOP 19 after the startup of the engine 1 is shown FIG. 6. Control contents from step S1 to step S7 shown in FIG. 6 are similar to those of the example shown in FIG. 3. According to another control example shown in FIG. 6, if the engine 1 has been started so that the answer of step S7 is YES, the routine advances to step S21 to reduce the duty cycle of the EOP 19. At step S21, in case the duty cycle of the EOP 19 has already been reduced to 50%, the current duty cycle is maintained. By contrast, in case the EOP 19 is activated with a 64% duty cycle, the duty cycle is reduced to the 50% to keep activating the EOP 19.

Then, at step S22, it is determined whether or not the duty cycle of the EOP 19 is further reduced to stop the EOP 19, and whether or not the relay of the EOP 19 is turned off. If the duty cycle of the EOP 19 has not yet been further reduced so that the answer of the step S22 is NO, the routine returns to the step S4 to repeat the foregoing controls. If the duty cycle has been further reduced and the relay of the EOP 19 has been turned off so that the answer of the step S22 is YES, the routine advances to step S23.

At step S23, it is determined whether or not vehicle Ve is brought into the ready-off state. If the vehicle Ve has not yet been brought into the ready-off state so that the answer of step S23 is NO, the routine returns to the step S1 to repeat the foregoing controls. If the vehicle Ve has already been brought into the ready-off state so that the answer of step S23 is YES, the routine is terminated until the vehicle Ve has been brought into the ready-on state again.

The above-mentioned interference between the oils discharged from the MOP 18 and the EOP 19 may be avoided by modifying the hydraulic circuit 30 in such a manner that the passage for delivering the oil from the MOP 18 to the lubrication sites and the passage for delivering the oil from the EOP 19 to the lubrication sites are formed independently from each other. In the hydraulic circuit thus modified, opportunities to startup the stopping EOP 19 can be reduced by thus keeping the EOP 19 activating continuously after the startup of engine 1.

The control system of the present invention may be applied to vehicles other than the vehicle Ve having the engine 1, the first motor-generator 2 and the second motor-generator 3. Specifically, the control system may be applied to any kind of vehicles having a mechanical oil pump activated by the prime mover and an electric oil pump activated by the electric motor, e.g., a hybrid vehicle having an engine and a single motor-generator, and an electric vehicle in which a prime mover is formed only by a motor(s) without an engine.

What is claimed is:

1. A control system for a vehicle having a motor serving as a prime mover, and an electric oil pump driven by a pumping motor to generate hydraulic pressure and to deliver oil to a lubrication site,
   wherein the control system is configured to:
   start the electric oil pump by the pumping motor with a predetermined duty when a main switch is turned on to bring the vehicle into a ready-on state where the vehicle is ready to travel;
   determine whether the electric oil pump is required to deliver the oil to the lubrication site;
   activate the pumping motor with a first duty if the electric oil pump is required to deliver the oil to the lubrication site; and
   activate the pumping motor with a second duty that is smaller than the first duty if the electric oil pump is not required to deliver the oil to the lubrication site.

2. The control system for the vehicle as claimed in claim 1, wherein the control system is further configured to start the electric oil pump after the vehicle is brought into the ready-on state to be propelled by the motor.

3. The control system for the vehicle as claimed in claim 1, wherein the control system is further configured to activate the pumping motor with a third duty to drive the electric oil pump during a predetermined period after starting the electric oil pump, wherein the third duty is larger than the first duty.

4. The control system for the vehicle as claimed in claim 1, wherein the pumping motor includes a sensorless motor that does not have a sensor for detecting a position of a rotor.

5. The control system for the vehicle as claimed in claim 1,
   wherein the vehicle comprises an engine and a mechanical oil pump driven by the engine to generate hydraulic pressure; and
   wherein the control system is further configured to keep activating the electric oil pump when starting the engine during activation of the electric oil pump.

6. The control system for the vehicle as claimed in claim 1,
   wherein the vehicle comprises an engine, a mechanical oil pump driven by the engine to generate hydraulic pressure, and a passage to which the oil discharged from the electric oil pump and the oil discharged from the mechanical oil pump are delivered; and
   wherein the control system is further configured to stop the electric oil pump when starting the engine during activation of the electric oil pump.

* * * * *